US012563139B1

(12) United States Patent
Cooper et al.

(10) Patent No.: US 12,563,139 B1
(45) Date of Patent: Feb. 24, 2026

(54) SECURE SELECTIVE DISCLOSURE OF PROTECTED INFORMATION

(71) Applicant: UIPCO, LLC, San Antonio, TX (US)

(72) Inventors: Nina Cooper, San Antonio, TX (US); Mark Paxman Warnick, San Antonio, TX (US); Courtney Evans, Forney, TX (US); Megan Sarah Jennings, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 419 days.

(21) Appl. No.: 18/174,842

(22) Filed: Feb. 27, 2023

Related U.S. Application Data

(60) Provisional application No. 63/268,654, filed on Feb. 28, 2022.

(51) Int. Cl.
*H04M 1/72463* (2021.01)
*G06F 21/42* (2013.01)
*H04M 1/72412* (2021.01)

(52) U.S. Cl.
CPC ...... *H04M 1/724634* (2022.02); *G06F 21/42* (2013.01); *H04M 1/72412* (2021.01); *G06F 2221/2141* (2013.01)

(58) Field of Classification Search
CPC ........ H04M 1/724634; H04M 1/72412; G06F 21/42; G06F 2221/2141
See application file for complete search history.

(56) References Cited

U.S. PATENT DOCUMENTS

| | | | |
|---|---|---|---|
| 7,762,456 B2 * | 7/2010 | Register, Jr. ....... | G06K 19/0719 235/382 |
| 2006/0143297 A1 * | 6/2006 | Korhonen ......... | H04M 1/72427 709/227 |
| 2009/0100575 A1 * | 4/2009 | Darnborough ... | G06K 19/07749 2/244 |
| 2017/0054842 A1 * | 2/2017 | Choi ................ | H04M 1/72463 |

* cited by examiner

*Primary Examiner* — Farid Seyedvosoghi
(74) *Attorney, Agent, or Firm* — Plumsea Law Group, LLC

(57) ABSTRACT

A system and method for selective disclosure of protected information are provided. Embodiments provide a way to provide limited access to protected information during an emergency. A user may have a medical emergency, and may store protected information on a smartphone that may be useful for an emergency responder, such as certain medical information. The smartphone may provide selective access to only relevant medical information, or may allow a responder to call emergency contact numbers without exposing the actual number. Emergency responders have designated near-field communication chips or other electronic keys to unlock the protected information. Alternatively, near-field communication chips embedded in a wearable allow emergency responders to access protected information at a user's smartphone. Once the emergency responder has established his or her role, the user's smartphone unlocks and provides appropriate access until the responder indicates that access is done and the smartphone relocks.

19 Claims, 14 Drawing Sheets

200

140    130

210    MEDICAL RESPONDER
RECOGNIZED

220    RESPONDER
PASSWORD:

**********

500

POLICE OFFICER
INFORMATION:

• VITALS: - John Doe
- 25 years old
- 101 Main Street,
  Boston, MA
- (303)555-4621

• AVAILABLE INFORMATION:
- Car Insurance
- Emergency Contacts
- Basic Medical
  Information

600

700

| 710 | 720 |
|---|---|
| USER INFORMATION EDITOR | UPDATE |
| Name: John Doe | ○ |
| Address: 101 Main Street Boston, MA | ○ |
| Phone: (303)555-4621 | ○ |
| SSN: 123-45-6789 | ○ |
| Health Insurance: Blue Cross Blue Shield | ○ |
| Health Insurance Number: 26-AC-4586 | ○ |
| Medical History: Asthma, Diabetes | ○ |
| Criminal History: Shoplifting | ○ |
| Emergency Contacts: | ○ |
| - Spouse: Jane Doe | ○ |
| - Sibling: Bob Smith | ○ |
| - Employer: BigCorp | ○ |
| - Insurer: USAA | ○ |

730 — USER INFORMATION EDITOR
732 — Name: John Doe
734 — Address: 101 Main Street Boston, MA
736 — Phone: (303)555-4621
738 — SSN: 123-45-6789
740 — Health Insurance: Blue Cross Blue Shield
742 — Health Insurance Number: 26-AC-4586
744 — Medical History: Asthma, Diabetes
746 — Criminal History: Shoplifting
750 — Emergency Contacts:
752 — - Spouse: Jane Doe
754 — - Sibling: Bob Smith
756 — - Employer: BigCorp
758 — - Insurer: USAA

SECURE SELECTIVE DISCLOSURE OF PROTECTED INFORMATION

CROSS-REFERENCE TO RELATED APPLICATIONS

This application claims the benefit of U.S. Provisional Patent Application Ser. No. 63/268,654 filed on Feb. 28, 2022 and titled "Secure Selective Disclosure of Protected Information." The disclosure of which is incorporated by reference in its entirety.

TECHNICAL FIELD

The present disclosure generally relates to secure selective disclosure of protected information. The present disclosure more specifically relates to a method and system for selectively disclosing sensitive information.

BACKGROUND

During an emergency, a responder may need to access a user's protected information, such as medical information or emergency contacts. Accordingly, it may be desirable to provide some access to the protected information without providing the information itself. Moreover, it may be desirable to provide a mechanism by which emergency responders can use an electronic key or credential to establish their role as being entitled to access some of the protected information, albeit in a regulated manner.

However, present authentication systems either authenticate a user and provide full access to a device or an account at a device, or block access to the device. Present approaches do not provide an effective way to provide limited access to protected information and efficiently establish that emergency responders should have such limited access. Present approaches also do not provide for protecting information in a limited way, such as by exposing the information for use in emergency purposes while hiding the actual information.

There is a need in the art for a system and method that addresses the shortcomings discussed above.

SUMMARY

In one aspect, a method for secure selective disclosure of protected information of a first user at a first mobile device of the first user includes detecting a second mobile device in proximity to the first mobile device of the first user. The method further includes receiving a credential from the second mobile device. The method further includes partially unlocking the first mobile device of the user based on the credential. The method further includes determining a type of a second user of the second mobile device, based on the credential. The method further includes establishing access privileges for the second user to the protected information of the first user based on the type of the second user. The method further includes receiving an access request for protected information of the first user from the second user. The method further includes providing access to the requested protected information to the second user based on the access privileges, wherein the second user has partial access to some of the protected information based on the access privileges.

In another aspect, a method for secure selective disclosure of protected information of a first user at a first mobile device of the first user includes receiving a first credential from a second mobile device at the first mobile device of the first user, using near-field communication. The method further includes determining a type of a second user of the second mobile device based on the first credential. The method further includes providing first access privileges to the protected information of the first user to the second user of the second mobile device, based on the type of the second user. The method further includes receiving a second credential from a third mobile device at the first mobile device of the first user, using the near-field communication. The method further includes determining a type of a third user of the third mobile device, based on the second credential. The method further includes providing second access privileges to the protected information of the first user to the third user, based on the type of the third user.

In another aspect, a method for secure selective disclosure of protected information of a first user at a mobile device of the first user includes receiving an access request from a second user to access the mobile device of the first user. The method further includes receiving an identification credential from the second user. The method further includes partially unlocking the mobile device of the first user based on the identification credential. The method further includes determining an identity of the second user associated with the identification credential. The method further includes establishing access privileges to the protected information of the first user based on the identity of the second user. The method further includes providing access to the protected information to the second user based on the access privileges, wherein the protected information is stored in a partitioned region of memory that protects the protected information to which the second user has partial access from direct access.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 shows a user interface diagram of a smartphone allowing a user to store different types of protected information, according to an embodiment;

DETAILED DESCRIPTION

In embodiments, a system selectively discloses portions of protected information of users when users experience emergencies, such as medical emergencies. Users may be clients of an organization such as a health insurance provider. During a medical emergency, an emergency responder may need access to a user's medical information for treatment. However, it is important to keep protected information secret, to protect a user's privacy. An emergency responder may have access to subset of user's private information during an emergency. Systems may mange access to information using near-field communication (NFC) chips, provided in different ways, or other electronic keys or credentials. With respect to the information there may be multiple levels of or settings for access, depending on who accesses information and the purpose for access. Once an emergency responder establishes an identity using electronic keys or credentials, the system provides access to information by unlocking the user's smartphone. The emergency responder uses such information to treat the user or otherwise handle the emergency.

In the following disclosure, "protected information" refers to information that a user may want to keep private, secret, or confidential. Such information may be information that could be abused for identity theft, may be stigmatizing, or may simply be information that identifies a user or would jeopardize the user's privacy. Such information could be health information, information about a user's background or criminal record, or simply information identifying the user. For example, such information is sometimes referred to as protected personal information (PPI) or personal identifying information (PII).

Users may differ about which information they wish to keep protected, and from whom. Some users may feel comfortable sharing their whole name with anyone, whereas other users may only feel comfortable sharing initials. Other users may not wish to share their name at all. Some users may feel comfortable sharing their phone number, while others may not. However, even if information is not information that a user ordinarily shares, a user may wish to make sure that the information is made available in an emergency. For example, a user may not ordinarily wish to share that he or she is a diabetic with the public at large, for medical privacy reasons. However, if a user is in a diabetic coma, a medical responder needs to understand what is going on and most users would want the medical responder to know that they have diabetes so that they can be treated effectively even though they are unconscious and cannot release the information themselves.

Figure 1:
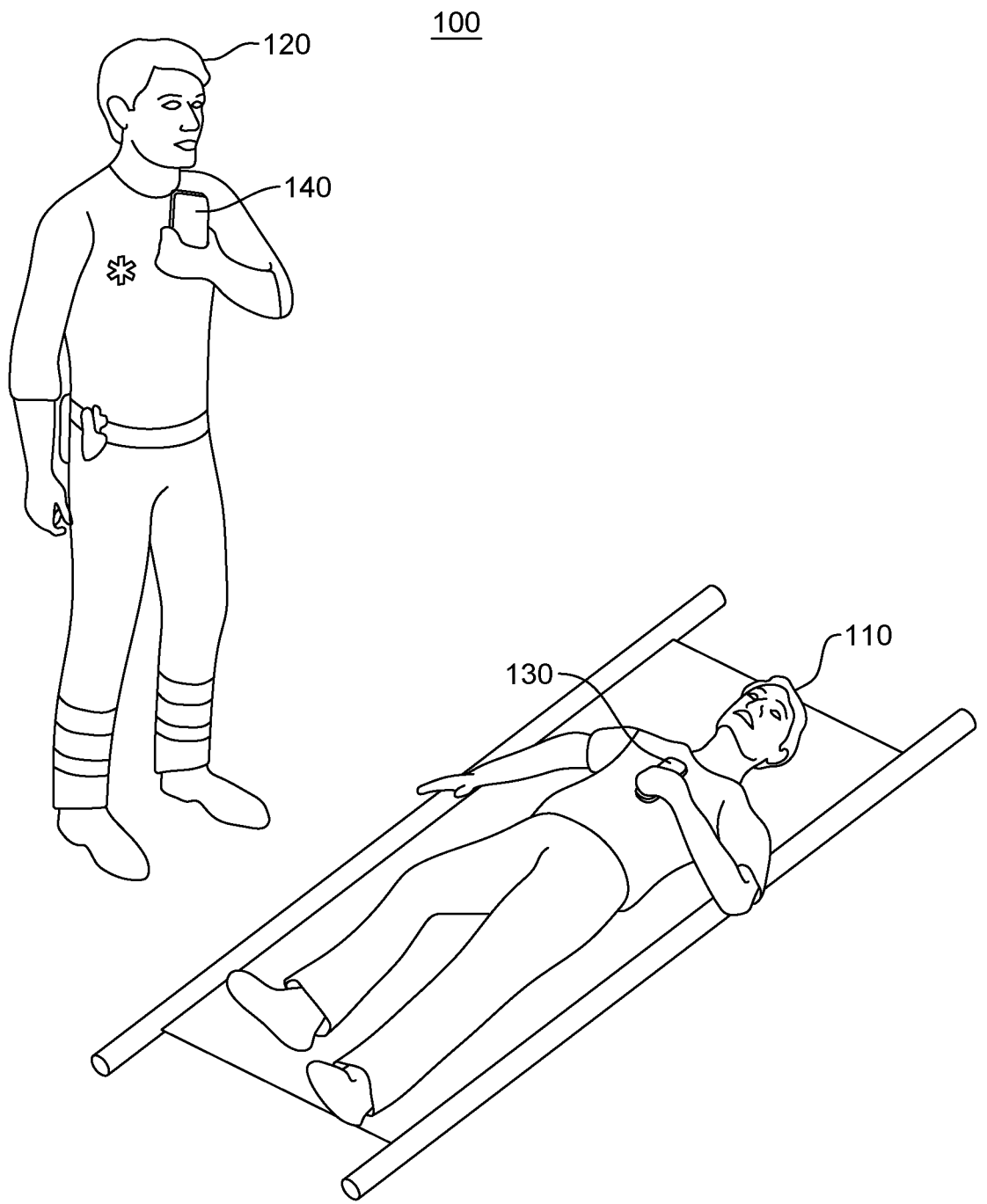
FIG. 1 shows a diagram of an emergency responder assisting a user experiencing a medical emergency, according to an embodiment.

FIG. 1 shows a diagram 100 of an emergency responder 120 assisting a user 110 experiencing a medical emergency, according to an embodiment. As used in the following discussion, the user 110 refers to the actual owner of smartphone 130. The protected information is information associated with user 110. In various situations, a user 110 may have a medical emergency that causes them to require assistance from a medical responder 120. For example, the medical emergency may include a heart attack, an epileptic seizure, a stroke, an accidental injury, and so on, as nonlimiting examples.

Figure 6:
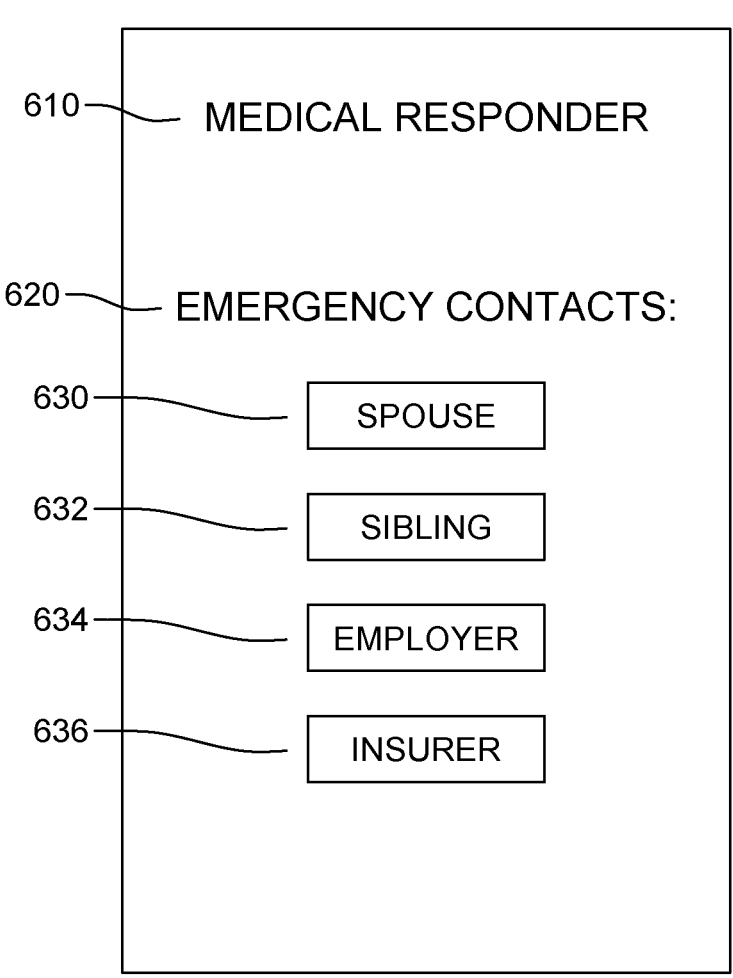
FIG. 6 shows a user interface diagram of a smartphone allowing access to emergency contacts by a medical responder, according to an embodiment.

In such emergencies, an emergency responder 120 finds access to the user's medical information helpful. Because of the emergency, the user 110 cannot provide protected information due to being incapacitated. However, medical information is private, and it is important to provide special access to protected information on a need-to-know basis. Thus, approaches provide ways for emergency responders to gain access to enough information to be able to successfully help a user 110 in an emergency, but to restrict access so that emergency responders do not gain so much access that the user's privacy is violated. For example, embodiments may provide for a way for an emergency responder 120 to be able to initiate a phone call to an emergency contact while keeping the phone number and the full identity of the emergency contact a secret, as shown in FIG. 6.

For example, FIG. 1 shows a user 110 unconscious and prone on the ground, lying on a stretcher. This is merely an illustrative example, and the user 110 need not be unconscious and/or prone. However, the embodiments are particularly helpful in a use case in which the user 110 is unconscious, traumatized, or otherwise not fully functional. Embodiments provide a way for the emergency responder 120 to access the user's private information when the user 110 is unable to provide the information on his or her own. In FIG. 1, the user 110 is holding a smartphone 130. As discussed further, the smartphone 130 stores protected information for the user 110. Parts of such information are unlocked as needed for an emergency responder 120 when the emergency responder 120 establishes a valid need for the information. However, the information is stored in a partitioned area in the memory of smartphone 130, ensuring that the emergency responder 120 is able to access needed aspects of the information while preserving the user's privacy.

For example, the emergency responder 120 may arrive on the scene, where a user 110 is unconscious or otherwise in urgent need of medical care. Depending on how the emergency responder 120 was summoned to the scene, the emergency responder 120 may have varying degrees of knowledge about what the cause of the emergency was. For example, the emergency responder 120 may arrive on the scene in response to a 911 call or an emergency alert signal. Alternatively, if the user 110 is using a wearable medical device that monitors the user's vitals, the emergency responder 120 may have pertinent information, such as blood pressure or pulse information that may indicate the nature of the medical emergency.

Thus, the medical responder 120 arrives on the scene with a smartphone 140. Such a smartphone 140 includes a digital key that establishes all or part of the credentials required for the medical responder 120 to establish a medical role and a requirement for information. For example, the smartphone 140 may include a near-field communication (NFC) app with credentials establishing the access privileges of the medical responder. Other forms of wireless communication may also be used to unlock the smartphone 130 of user 110, such as but not limited to Wi-Fi, Bluetooth, ZigBee, cellular, 4G, 5G, and so on. The medical responder 120 may also create a wired connection between smartphone 130 and smartphone 140 to send credentials used to unlock smartphone 130. Such a wired connection may use a Universal Serial Bus (USB) connection.

While the devices involved in the interactions of embodiments are characterized as being smartphone 130 and smartphone 140, embodiments are not limited to using smartphones. For example, other embodiments may use feature phones, tablets, phablets, portable digital assistants (PDAs), MP3 players, and so on. Additionally, other embodiments use wearables, as discussed further in FIG. 10, below.

The medical responder 120 may want several types of medical information. For example, the medical responder 120 may want to know information about preexisting conditions or a user's medical history. Such information may help determine a type of medical emergency that is currently occurring. Such information may also guide therapy and treatment. For example, if the user 110 has a history of asthma or is a smoker, this information may help a medical responder to successfully treat breathing difficulty. It may also be helpful for the emergency responder 120 to be aware of any treatments the user 110 takes on a regular basis, such as medication and other therapy. Knowing this information may help avoid providing treatments that will not be tolerated well, such as drugs with a potentially hazardous interaction, a contraindication, or an allergy. For example, it may be helpful to be aware that a user 110 has hypothyroidism and takes thyroid supplements, uses Continuous Positive Airway Pressure (CPAP) therapy for sleep apnea, and so on. Medical information may also include advance directives, for example, Do Not Resuscitate (DNR) status and organ donor status.

Figure 2:
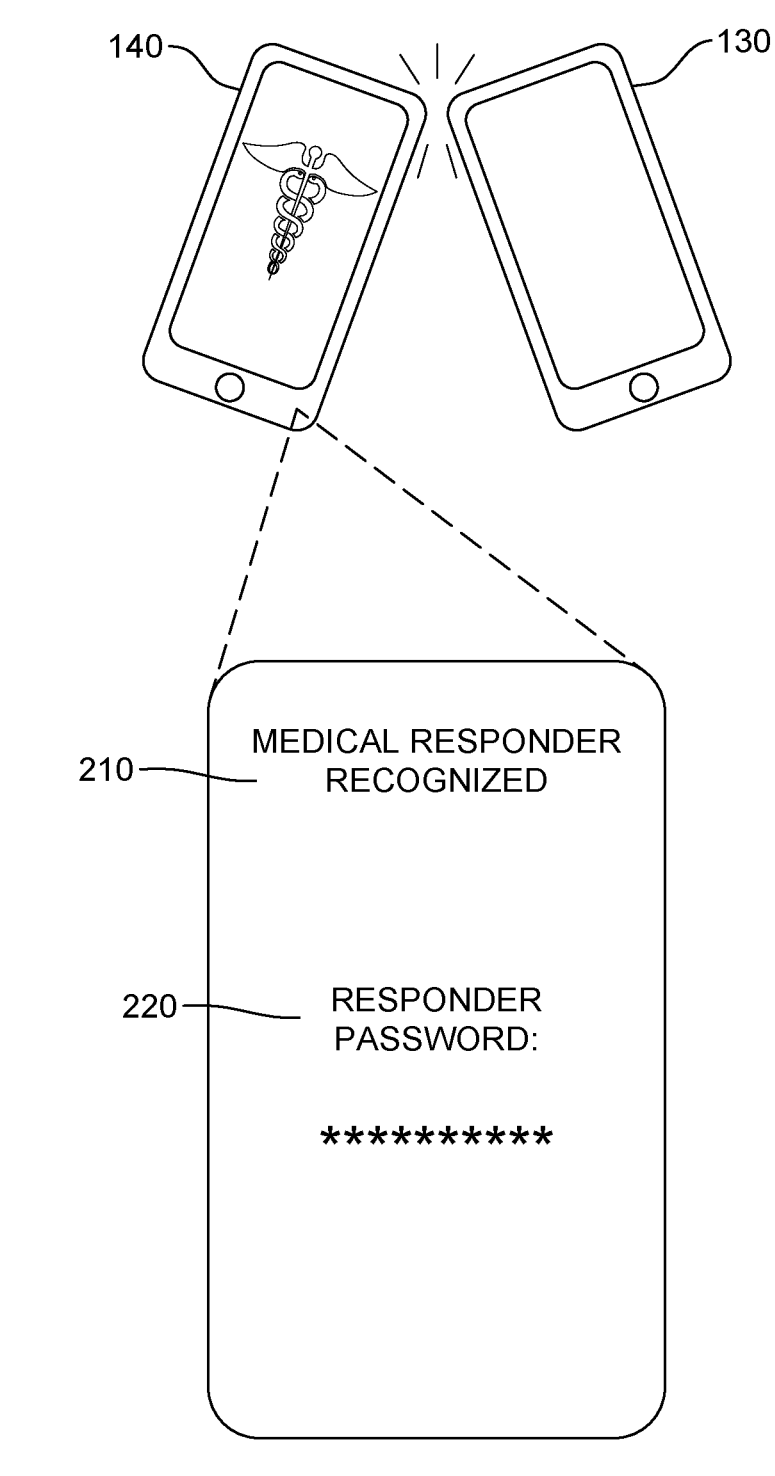
FIG. 2 shows a user interface diagram of a medical responder interacting with a smartphone, according to an embodiment.

FIG. 2 shows how emergency responders respond by using mobile devices to access information about the user 110. Emergency responders use a mobile device and provide credentials establishing that they are legitimately entitled to data under consideration. Emergency responders may have specially programmed near-field communication (NFC) chips or other electronic credentials that allow them to establish access to protected information of the user 110.

For example, the system may also allow access to protected information indirectly. Emergency responder 120 can use protected information without actually having full access to protected information. For example, a system may allow emergency responder 120 to call an emergency contact of user 110 while keeping a phone number (or even the identity) of an emergency contact secret. A system may provide indirect access to other information such as ID information (Social Security number, Driver's License, Health Insurance Number) and biometrics without providing actual access to information.

For example, a system may provide emergency responder 120 to access information in a protected repository that normally requires a Social Security number and/or a fingerprint for access by the main user 110. The emergency responder 120 does not access credentials themselves, just access privileges associated with credentials, such as access to a medical history of a user 110. Only a portion of medical history may be available, based on a type of emergency responder 120. Additionally, a user 110 may prefer to protect his or her privacy, and thus may keep certain information confidential and private, regardless of whether it would facilitate medical treatment.

FIG. 2 shows a user interface diagram 200 of a medical responder interacting with a smartphone 130, according to an embodiment. For example, FIG. 2 shows a smartphone 130 of a user 110 and a smartphone 140 of an emergency responder 120. For example, the emergency responder 120 may wave a smartphone 140 with an appropriate near-field communication (NFC) card, chip, or app inside within appropriate distance of the user's smartphone 130 to provide the emergency responder 120 with access to protected information that is appropriate to the type of emergency responder 120, here a medical responder. As a small variation, the emergency responder 120 may tap his or her smartphone 140 on the smartphone 130 of user 110.

Figure 10:
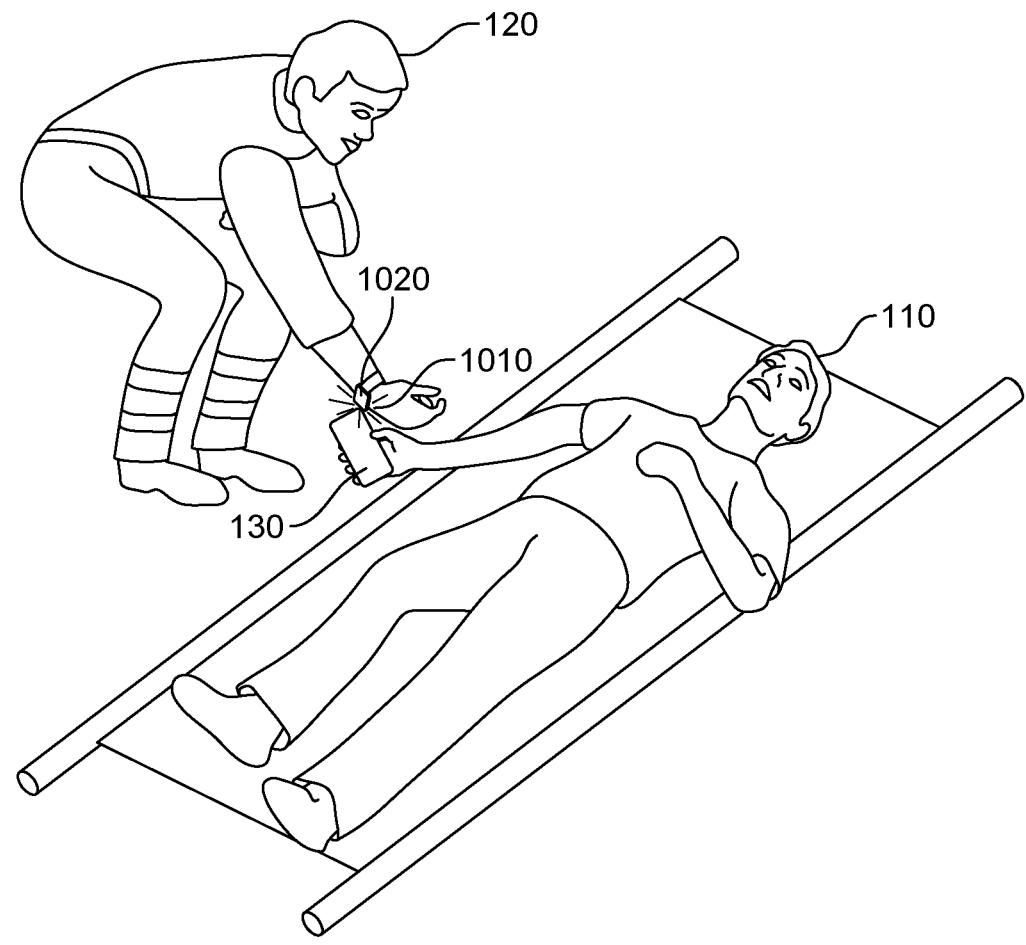
FIG. 10 shows a diagram of an emergency responder assisting a user experiencing a medical emergency using a wearable to access the smartphone of the user, according to an embodiment.

Other ways of unlocking are also possible. For example, the emergency responder 120 may use a wireless protocol or a wired connection to establish a link between smartphone 130 and smartphone 140 and unlock smartphone 130 accordingly. In another variant, the emergency responder 120 may scan a QR code on smartphone 130 using smartphone 140 or vice versa to establish access privileges to smartphone 130. As shown in FIG. 10, there are also additional alternatives to phone-based pairing, such as using a wearable to unlock the smartphone 130.

FIG. 2 shows that smartphone 140 corresponds to a medical responder, based on the symbol shown of the screen of smartphone 140. In the example of FIG. 2, because smartphone 140 has been brought into close proximity with smartphone 130, the screen of smartphone 140 shows that a medical responder has been recognized at message 210. Once the initial recognition has occurred, a second factor of authentication may be required at message 220, which requests a responder password. As shown in FIG. 2, the medical responder provides such a password to gain access to the user's information at smartphone 130, thereby unlocking appropriate information. Providing a password as shown at 220 is only an example.

The physical contact of smartphone 140 with smartphone 130 may be enough to unlock smartphone 130, without another form of authentication. Also, alternative forms of additional authentication may be used in addition to or instead of a password. For example, a user ID may be required in addition to a password. There may be additional authentication required, such as a one-time code, a private key, or a biometric form of authentication such as a fingerprint, a retinal scan, a voice print, face recognition, vein recognition, and so on. Once the medical responder is fully authenticated, the medical responder has established that he or she is a valid emergency responder 120, and he or she should have access to protected information that is relevant to the medical care of the user 110. It is also possible that there may be varying types of access privilege provided to different medical professionals and in differing settings. For example, different medical information might be made accessible to an emergency medical technician (EMT) as opposed to a medical doctor (MD).

Figure 3:
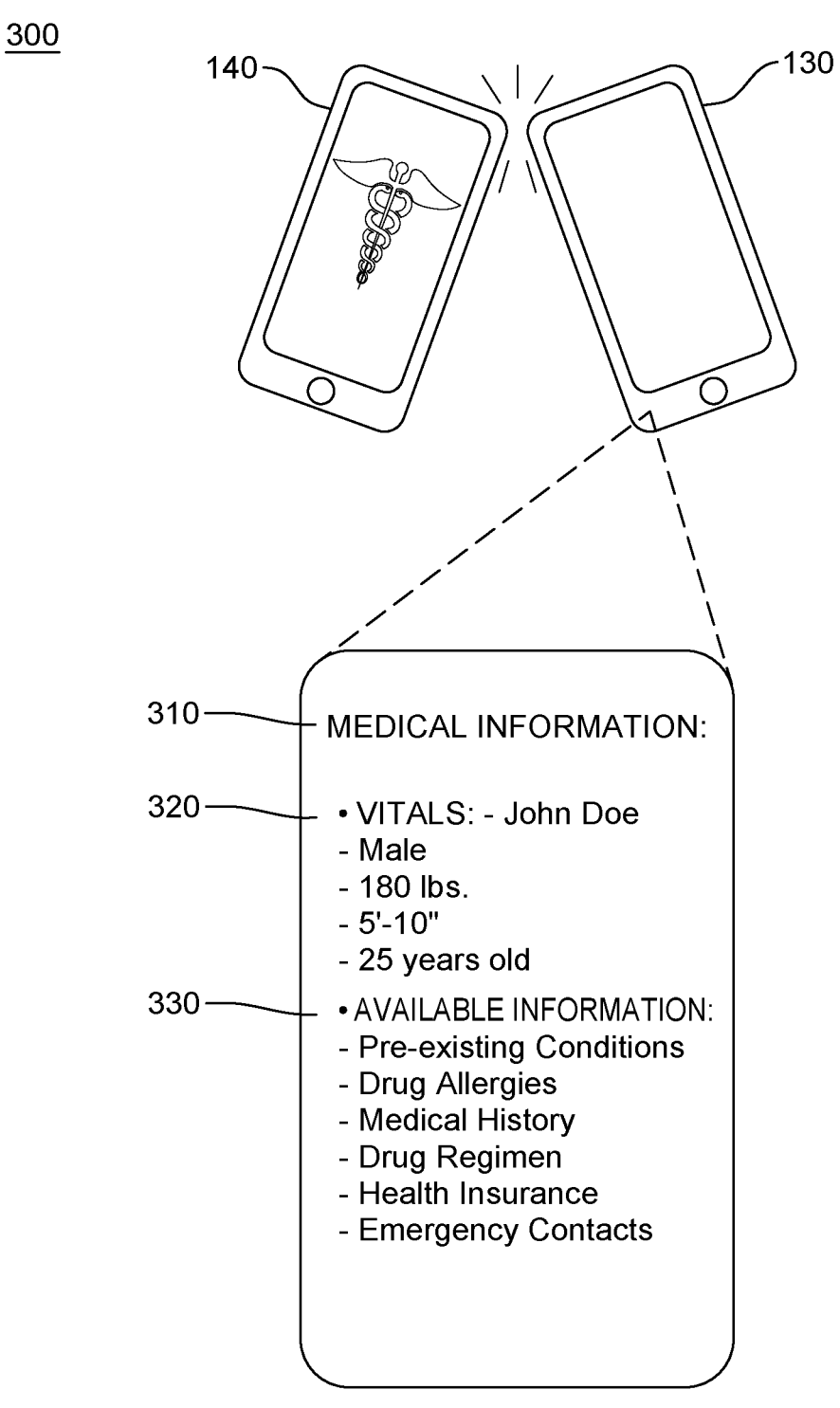
FIG. 3 shows another user interface diagram of a medical responder interacting with a smartphone, according to an embodiment.

FIG. 3 shows another user interface diagram 300 of a medical responder interacting with a smartphone 130, according to an embodiment. For example, smartphone 140 and smartphone 130 are in proximity with one another and any other additional steps have been taken to unlock access by the medical responder. Therefore, smartphone 130 displays information. Because it is a medical responder to whom access is being provided, the smartphone 130 shows medical information 310. In order to initially present key information, the smartphone 130 presents vitals 320 of the patient, including her name (Jane Doe), her gender (Female), her weight (140 lbs.), her height (5' 4"), and her age (25 years old.). These vitals are basic information that would be important for a medical responder to know, and could include additional information to in addition to or instead of these example pieces of information presented in FIG. 3.

The smartphone 130 also provides access to various pieces of available information 330. For example, available information for a medical responder could include pre-existing conditions, drug allergies, medical history, drug regimen, and emergency contacts. However, as shown below, the smartphone may only provide partial access to such information. For example, access to emergency contacts may not include access to all information about the emergency contacts, but may include only the capability to initiate a phone call to an emergency contact, as appropriate.

Figure 4:
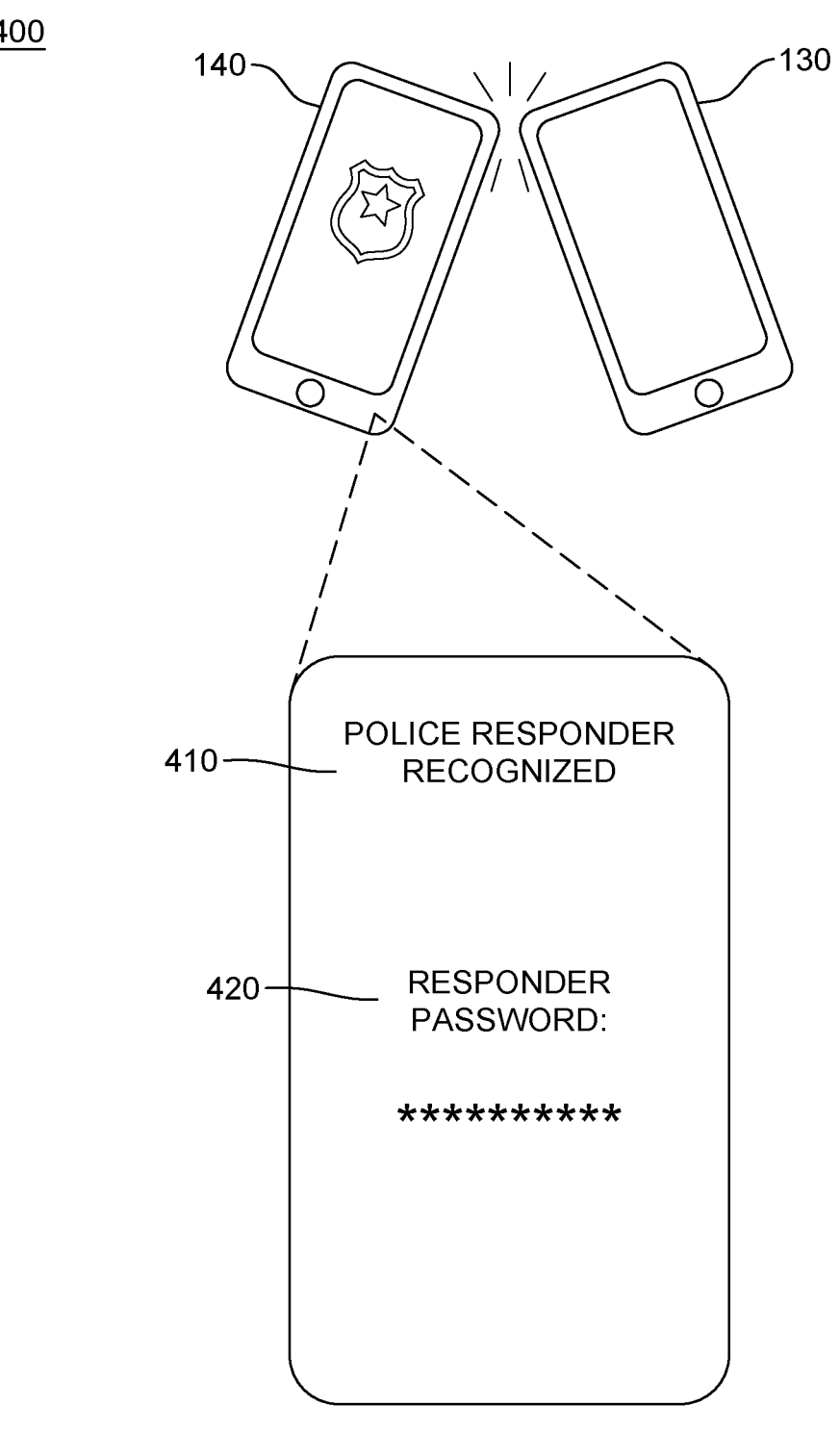
FIG. 4 shows a user interface diagram of a police officer interacting with a smartphone, according to an embodiment.

FIG. 4 shows a user interface diagram 400 of a police officer interacting with a smartphone 130, according to an embodiment. FIG. 4 is similar to FIG. 2, except that the smartphone 140 that unlocks smartphone 130 is held by a police officer responder rather than a medical professional. Thus, FIG. 4 shows that smartphone 140 has a policeman's badge on it to indicate that a police officer responder is recognized. For example, smartphone 140 alerts the police officer that a police responder is recognized at 410. Then, the police officer optionally enters a responder password at 420. A similar discussion of the responder password entered at 420 applies to that of the responder password entered at 420, in that the password may be optional or may be replaced or supplemented by additional authentical information to grant device access.

Figure 5:
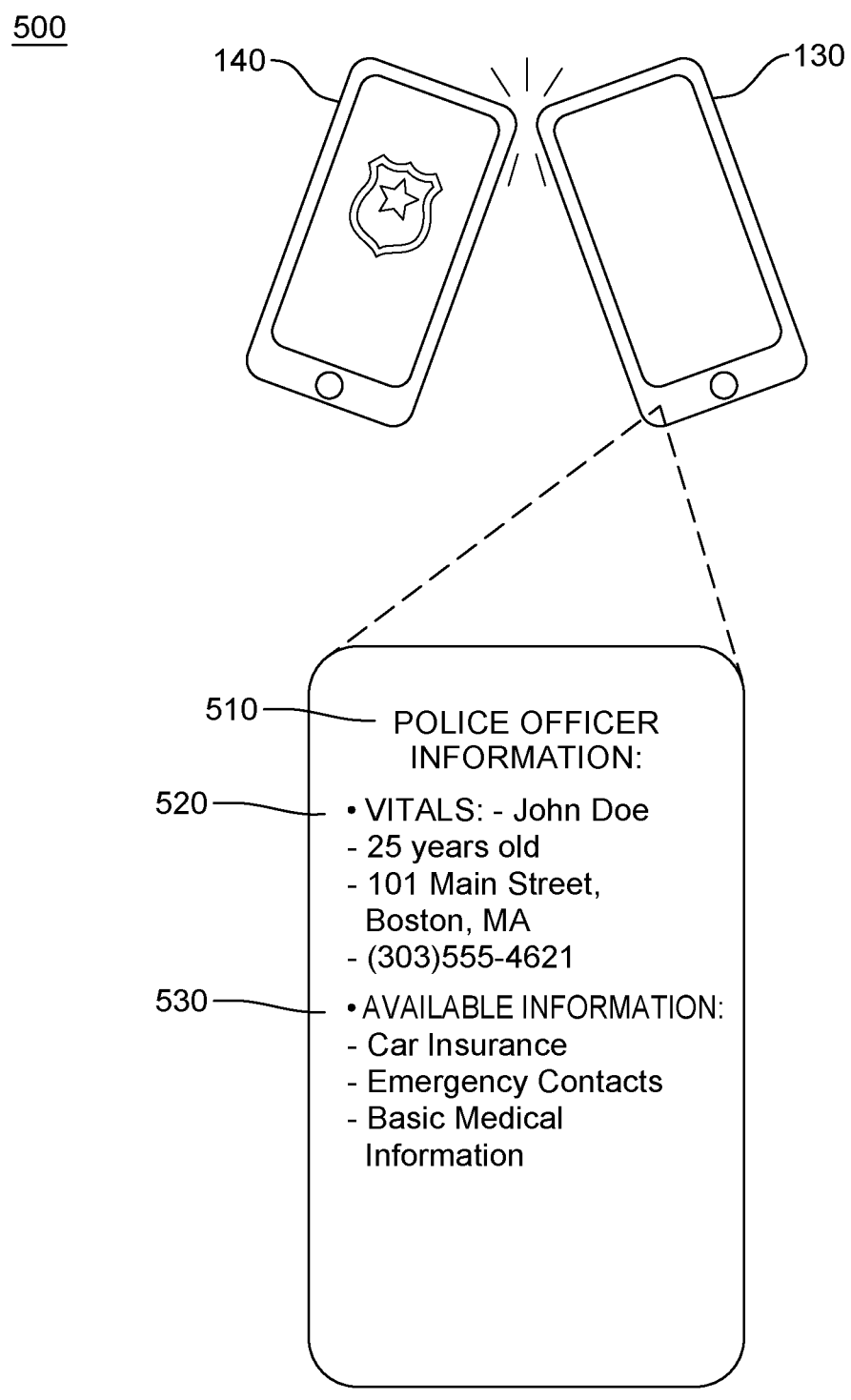
FIG. 5 shows another user interface diagram of a police officer interacting with a smartphone, according to an embodiment.

FIG. 5 shows another user interface diagram 500 of a police officer interacting with a smartphone 130, according to an embodiment. FIG. 5 is related to FIG. 3, but is directed to an embodiment in which a police officer is the emergency responder 120. For example, FIG. 5 shows that smartphone 130 displays police officer information 510. FIG. 5 also shows that smartphone 130 displays vitals for the police office's use. However, the vitals 520 presented to a police officer may differ from the vitals 320 presented to a medical responder. For example, the vitals 520 presented to a police officer, in the example of FIG. 5 include vitals of the user's name (Jane Doe), the user's age (25 years old), the user's address (101 Main Street, Boston, MA), and the user's phone number. As can be seen in FIG. 5, these vitals 520 may differ from the vitals 320 presented in FIG. 3, in that a police officer responder can sometimes benefit from information not used by a medical emergency responder 120 and vice versa.

Additionally, FIG. 5 provides available information 530 for use by the police emergency responder 120. For example, the provided available information 530 for the police emergency responder 120 includes information about car insurance, emergency contacts, and basic medical information. Thus, for example, the police emergency responder 120 may want to know the user's health insurance or drug allergies, but may not need the full set of medical information that an emergency medical technician would require. As in FIG. 3, the vitals 520 presented to a police responder may include additional information in addition to or instead of that shown in FIG. 5, and the available information 530 may include alternative types of information as well. Furthermore, the vitals 520 and the available information 530 may depend somewhat depending on the specific type of police responder. For example, a crime scene investigation (CSI) investigator might need different information from that a traffic officer would require.

FIG. 6 shows a user interface diagram 600 of a smartphone 130 allowing access to emergency contacts by a medical responder, according to an embodiment. For example, FIG. 6 shows that it is a medical responder 610 that has been authenticated. FIG. 6 shows that the smartphone 130 of the user 110 is providing emergency contacts 620 to emergency responder 120. In this example, emergency responder 120 is provided with buttons that give access to the spouse 630, sibling 632, employer 634, and insurer 646 of the user 110. However, these emergency contacts are only examples, and the user 110 may include different emergency contacts in lieu of or in addition to these enumerated emergency contacts shown in FIG. 6. Further, the actual emergency contacts provided may differ between types of emergency responder 120, such as between medical responders and police officer responder, and subtypes (such as a paramedic as opposed to a doctor).

An aspect of FIG. 6 that is to be noted is that the contact information for the emergency contacts is not exposed. In fact, even the name of the contacts in FIG. 6 is not exposed, but only their role. Thus, it may be helpful to preserve privacy in this manner, so that in an embodiment, only the type of relationship with an emergency contact is provided. In another example, additional information (such as a name) of the emergency contact is provided, but the actual contact information (phone number, e-mail address, social media account, etc.) is hidden. In another example, the full information for the emergency contact is provided. Moreover, different amounts of information access may be provided for different contacts. For example, the user 110 may choose to provide types of information for their spouse that the user 110 does not share with respect to information about his or her employer, and vice versa.

FIG. 7 shows a user interface diagram 700 of a smartphone allowing a user 110 to store different types of protected information, according to an embodiment. FIG. 7 shows a window of a user interface 700 that acts as a user information editor for a user 110 to enter and update his or her information for subsequent access during an emergency. Thus, the interaction in FIG. 7 occurs prior to an emergency, in that the goal is to have information for the user 110 stored in an anticipation of an emergency.

FIG. 7 shows a table with fields to enter information 710 along with a set of buttons 720 used to update the information once the user 110 is done entering and/or updating the information. However, FIG. 7 is only one example interface, and alternative interfaces may allow the user 110 to enter and/or update his or her information. For example, the user information editor 730 is labeled as such, at the top of a column of fields, which are shown populated in FIG. 7 with appropriate example information for a user 110.

For example, FIG. 7 shows a user's name 732 (Jane Doe), address 734 (101 Main Street, Boston, MA), phone number 736 ((303) 555-4621), Social Security number 738 (SSN) (123-45-6789), health insurer 740 (BlueCross BlueShield), health insurance number 742 (26-AC-4586), medical history 744 (asthma, diabetes), criminal history 746 (shoplifting), and emergency contacts 750. For example, the emergency contacts 750 include the user's spouse 752 (John Doe), sibling 754 (Bob Smith), employer 756 (BigCorp), and insurer 7588 (USAA). FIG. 7 shows an example where the emergency contacts 750 are simply identified by name, which creates a link between the identity of the specified individual and appropriate contact information, such as in a phonebook or contacts list.

In an alternative approach, the table 700 also allows the user 110 to enter information with the particular contact information to be used for an emergency responder 120. For example, the user 110 might want to provide that his or her spouse is called at their personal cell number in an emergency, rather than using a home landline or a business phone number. For each type of sensitive information, FIG. 7 provides an update button 720. Thus, when the information has been completely entered and/or corrected to the user's satisfaction, the user 110 presses the update button 720 to save the information. When entering information, the user information editor 730 may also automatically correct a user's input or use a drop-down to map the user's responses to recognized alternatives.

Figure 8:
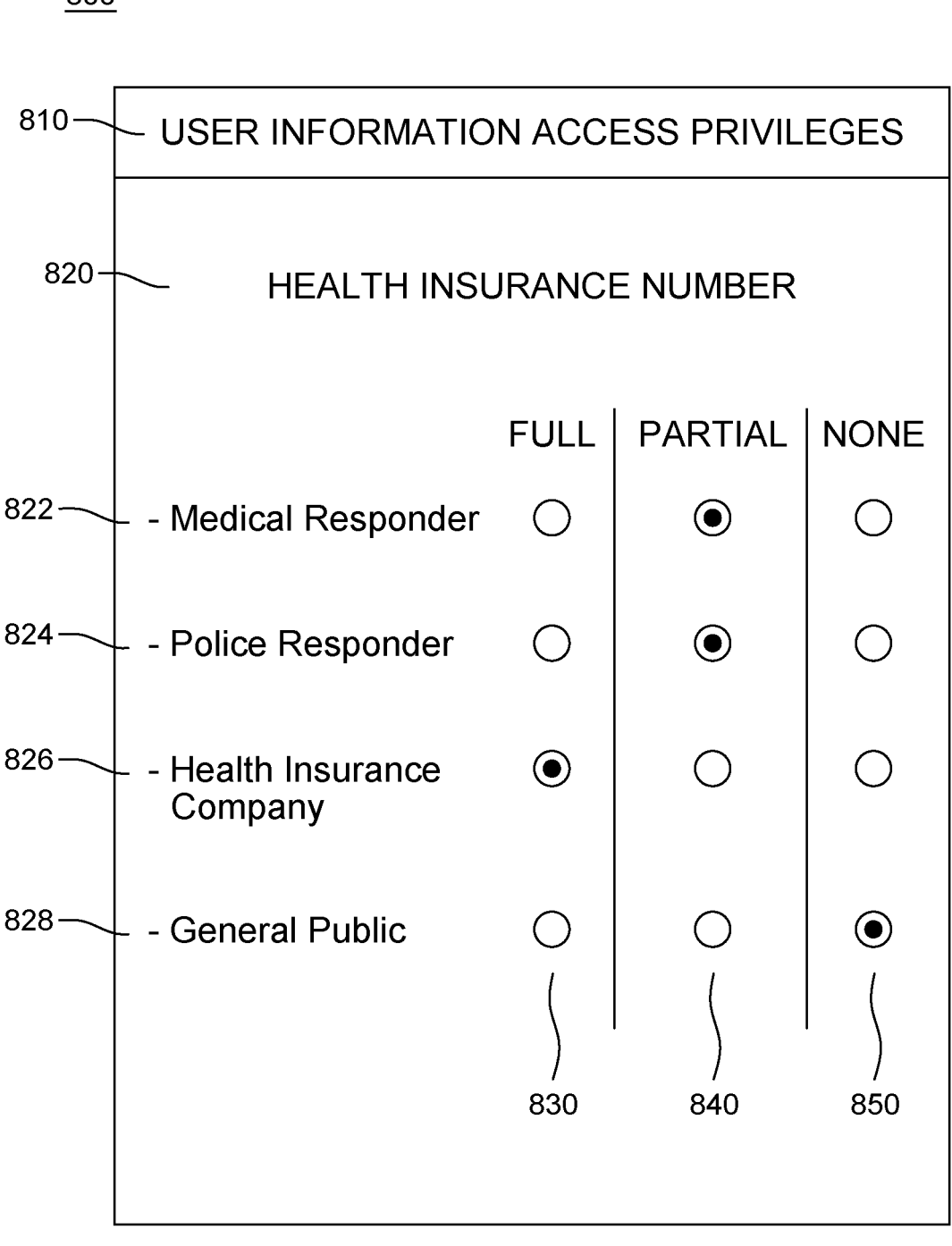
FIG. 8 shows a user interface diagram of a user interface for managing access privileges, according to an embodiment.

FIG. 8 shows a user interface diagram of a user interface 800 for managing access privileges, according to an embodiment. For example, user interface 800 provides a way to manage user information access privileges 810. For example, FIG. 8 shows the management of access privileges for a health insurance number 820. For example, user interface 800 allows the user 110 to set the access privileges for this information for a medical responder 822, a police responder 824, a health insurance company 826, and the general public 828. Each of these types of responder is assigned an access level to the information in question, which is a health insurance number 820 in the example of FIG. 8.

For example, the access levels may be full access 830, partial access 840, and access to none of the information 850. Full access 830 means that a given responder can access the entirety of the given type of information. Partial access 840 means that a given responder can access the information, but there may be limitations. For example, the information is protected in a partitioned portion of the information. Partial access 840 may mean that the responder can use the information in certain ways without full access to the information itself. For example, the responder may be able to call a phone number from emergency contacts without actually knowing what the number is. Access to none of the information 850 means that the system does not allow the responder any access to any part of the information, but instead protects the information in a partitioned portion of the memory, as discussed further, below.

For example, FIG. 8 shows access privileges for a health insurance number 820. For the medical responder 822 and police responder 824, partial access 840 is appropriate. Such partial access 840 means that the medical responder 822 and police responder 824 can provide the health insurance 820 to a qualified recipient such as health insurance company 826 with full access 830. The health insurance company 826 has full access 830 to health insurance number 820 because it must be able to actually use this information for dealing with the medical emergency.

FIG. 8 also shows user information access privileges for a health insurance number 820 for the general public 828. Here, the general public 828 is granted access to none of the information 850 for health insurance number 820, in that a health insurance number 820 is not information that should ordinarily be generally accessible without a particular role qualifying access. However, the general public 828 may be granted access, whether full or partial, to other kinds of information. For example, a user 110 may be comfortable sharing publicly accessible information with the general public 828, such as a home address or phone number.

However, the user 110 makes the decision, in that some users may be comfortable sharing their phone numbers while other are not comfortable with doing this sharing.

Figure 9:
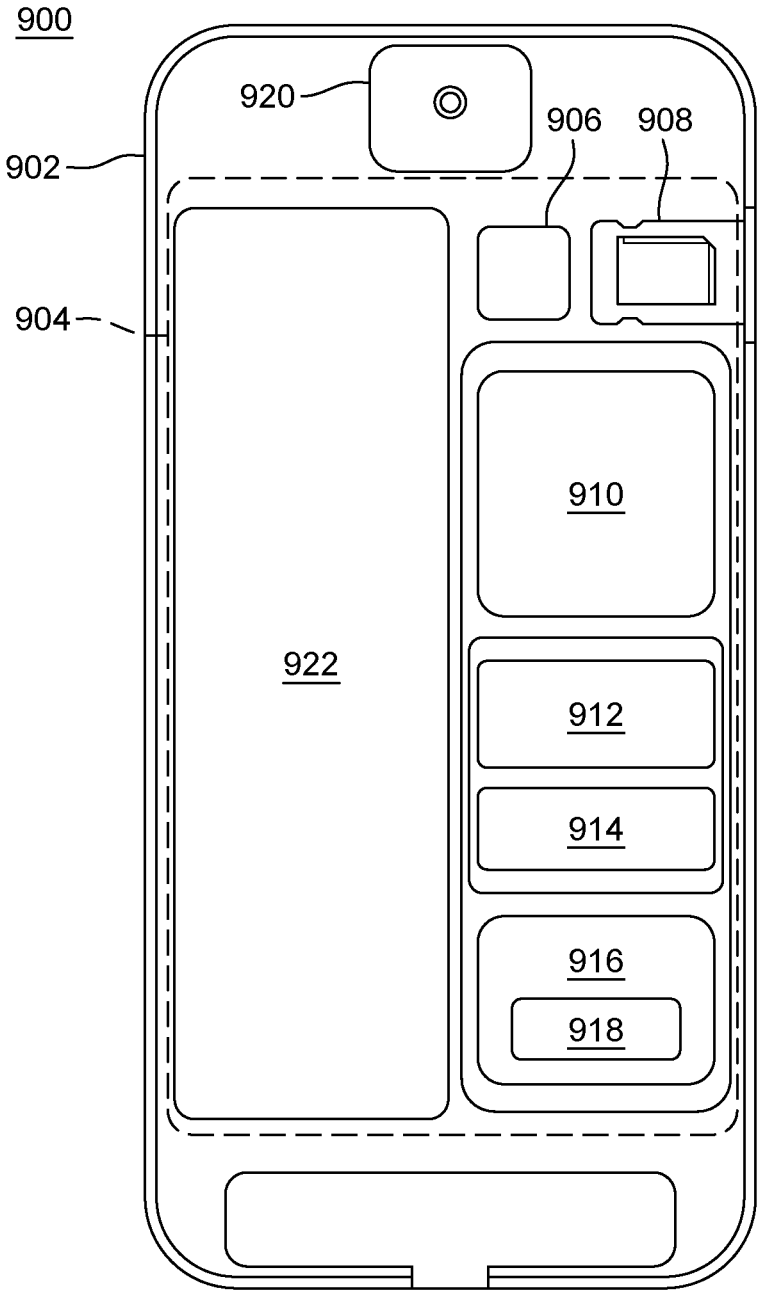
FIG. 9 is a structural diagram of a mobile device configured to provide selective access to protected information, according to an embodiment.

FIG. 9 is a structural diagram 900 of a mobile device configured to provide selective access to protected information, according to an embodiment. More specifically, FIG. 9 is a structural diagram 900 of a mobile device 902 showing components that may be used to provide selective access to protected information in an embodiment. Mobile device 902 includes a display 904. Display 904 may display information to a user of mobile device 902 when the user has established access privileges to certain information during an emergency. To clarify, the user of mobile device 902 is generally an emergency responder, such as emergency responder 120, in that mobile device 902 corresponds to smartphone 130 of user 110, but mobile device 902 is used by emergency responder 120 to access information during an emergency. The information may include vitals, as discussed above. Display 904 also acts as a user interface that a user of mobile device 902 may use to other protected information. In some embodiments, mobile device 902 can report protected information based on the type of emergency responder 120.

Mobile device 902 additionally includes a GPS unit 906. Data obtained from this GPS unit allows mobile device 902 to report its location, such that the ability to unlock may be affected by the location of the mobile device 902. For example, it may be easier to unlock a mobile device 902 when the mobile device 902 is present at a home of its owner. Also, mobile device 902 may report the location of the user 110, if needed for an emergency response. For example, having access to location may be helpful when initially summoning an emergency responder 120, or if additional assistance is required. Mobile device 902 may also include a subscriber identity module (SIM) 908. In some embodiments, SIM 908 may serve to associate mobile device 902 with the identity of the user 110 and may save some of the protected information in a secure manner.

Mobile device 902 may also include a processing unit 910 that acts as a control module for the components of mobile device 902, including display 904 and camera 920. Mobile device 902 may also include a communication module 912. Communication module 912 is associated with wireless communications (such as Wi-Fi, Bluetooth, near field communication (NFC) technologies, and 3G, 4G or 5G) for transmissions over the Internet and other devices, servers, and databases either local to the mobile device 902 or remote to the mobile device 902, as well as for unlocking the mobile device 902. In some embodiments, communication module 912 thus allows mobile device 902 to wirelessly send and receive information with regards to an emergency responder's device. Mobile device 902 may also include an authentication module 914. Authentication module 914 works in conjunction with communication module 912 to detect an emergency responder's device or other credential to be received by mobile device 902 for the unlocking.

Mobile device 902 further includes a memory 916. In some embodiments, memory 916 stores information about the user 110. For example, memory 916 stores protected information for the user 110, as shown in FIG. 7. In some embodiments, memory 916 may also store information about access privileges to the information, as shown in FIG. 8. In some embodiments, memory 916 may include a partitioned memory 918 that includes protected information, such that the partitioned memory 918 provides barriers to access to the protected information.

Mobile device 902 also includes a battery 922 and a camera 920. Battery 922 provides the power source for mobile device 902. In some embodiments, under the direction of a road hazard detection module, camera 920 takes images of the emergency responder 120 to be used for purposes such as facial recognition to identify the emergency responder 120 when establishing access privileges. Alternatively, camera 920 may take a picture of a form of ID such as a quick response (QR) code (such as on a badge or other wearable) that may allow an emergency responder 120 to establish that he or she should be entitled to have access to certain types of information. Taking a picture of such a QR code may substitute for the near-field communication (NFC) or other forms of wireless authentication used in other embodiments as a way to unlock the user's phone for access by the emergency responder 120.

FIG. 10 shows a diagram 1000 of an emergency responder 120 assisting a user 110 experiencing a medical emergency using a wearable to access the smartphone of the user 110, according to an embodiment. For example, FIG. 10 shows a user 110 lying prone and unconscious after a medical emergency, holding a smartphone 130. The emergency responder 120, such as a medical responder 120, instead of tapping a smartphone 140 onto smartphone 130, the medical responder 120 brings wearable 1020 into close contact with smartphone 130, and a wireless paring 1010 occurs, followed by an appropriate unlocking.

The wearable 1020 may be one of a variety of type of items. For example, the wearable 1020 may be a smartwatch or a fitness tracker, but other types of wearable 1020 are possible such as jewelry (bracelet, ring, etc.) with embedded information on a chip for near-field communication (NFC) authentication, and wearable could include a badge, a pin, an article of clothing, and so on. Once the embedded NFC chip is proximate to the smartphone 130, the smartphone 130 may use the information on the chip as information as the basis to unlock appropriately for the emergency responder 120.

Figure 11:
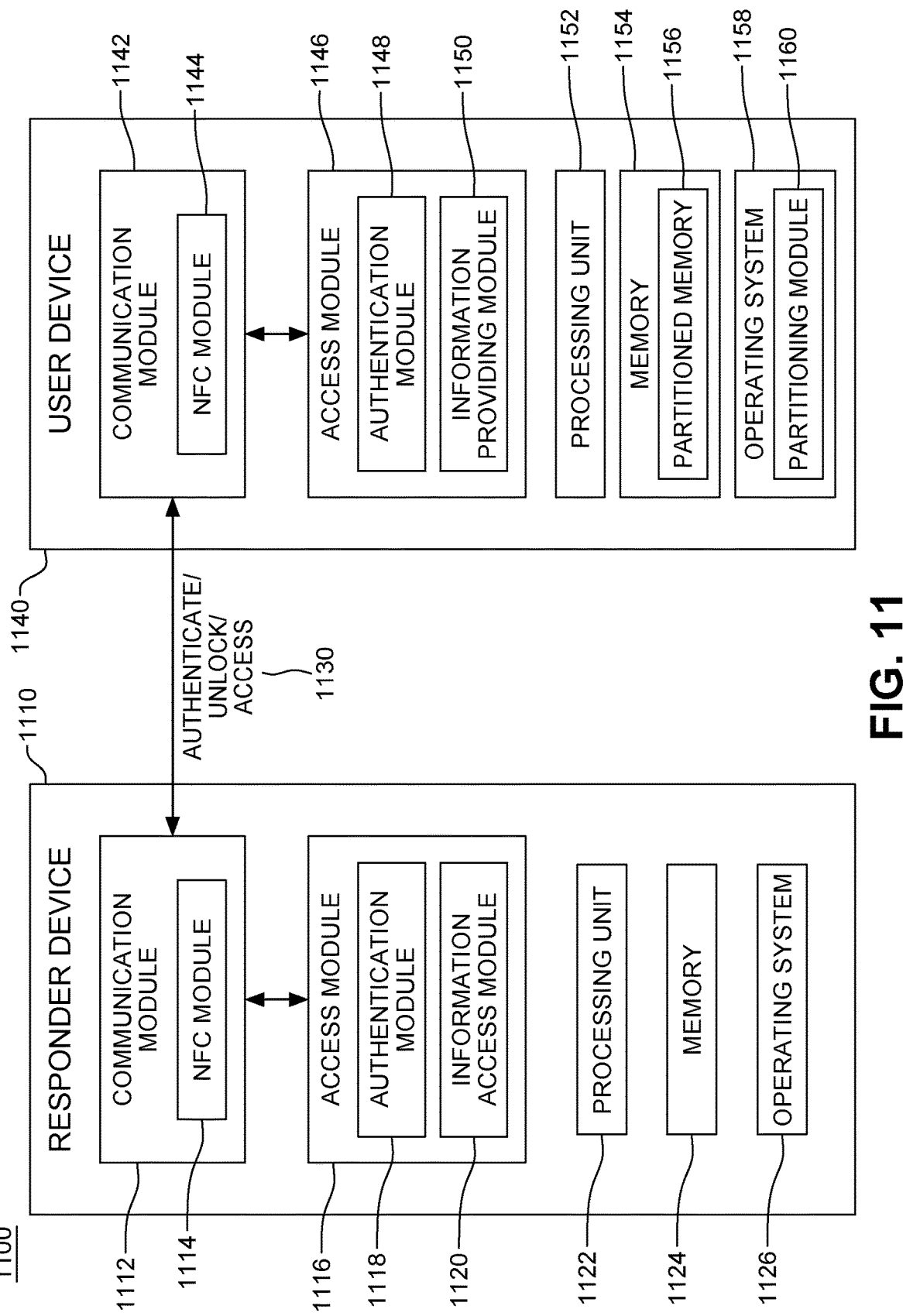
FIG. 11 shows a structural diagram of a responder device and a user device that interact with one another, according to an embodiment.

FIG. 11 shows a structural diagram 1100 of a responder device 1110 and a user device 1140 that interact with one another, according to an embodiment. For example, the responder device 1110 may include a communication module 1112, which may include a near-field communication (NFC) module 1114. The communication module 1112 establishes a connection between the responder device 1110 and the user device 1140. Such a connection may be formed by the NFC module 1114 using near-field communication (NFC), but the connection may also be formed using other wired or wireless communication protocols, as appropriate, such as Wi-Fi, Bluetooth, cellular connections, 4G, 5G, universal serial bus (USB), and so on. The responder device 1110 also includes an access module 1116. The access module 1116 provides the ability for the responder device 1110 to supply credentials that will give it. The access module 1116 includes an authentication module 1118 and an information access module 1120. For example, the authentication module 1118 may provide credentials establishing the type of responder and gathering any secondary forms of authentication that are required.

The information access module 1120 may provide supporting information by interacting with an emergency responder 120 who is a user of the responder device 1110 if additional information such as a password and/or user ID is required to access the information at the user device 1140. The responder device 1110 also includes a processing unit 1122, a memory 1124, and an operating system 1126. The processing unit 1122, the memory 1124, and the operation system 1126 support the operation of the responder device 1110 so that the responder device 1110 is able to supply appropriate credential(s) to user device 1140 to unlock the user device 1140 fully or partially to provide information access needed, such as during an emergency.

The responder device 1110 is in communication with user device 1140. For example, the responder device 1110 may have a communication using near-field communication (NFC) approaches (or other forms of wireless or wired communication) to cause the responder device 1110 to authenticate, unlock, and access data 1130 from user device 1140. User device 1140 includes a communication module 1142. The communication module 1142 includes an NFC module 1144. The communication module 1142 and the NFC module 1144 operate in conjunction communication module 1112 and the NFC module 1114 to authenticate and unlock the user device 1140. As noted, other forms of wireless communication can also unlock the user device 1140. As shown in FIG. 10, alternative NFC approaches may use NFC chips embedded in a possession of the emergency responder 120, such as a wearable or the like.

The user device 1140 also includes an access module 1146. The access module 1146 includes an authentication module 1148 and an information providing module 1150. The access module 1146 manages providing limited access to the user device 1140 when activated by a responder device 1110. For example, authentication module 1148 receives and validates credentials, such as from access module 1116 or a direct NFC credential (such as from an embedded NFC chip), and information providing module 1150 establishes an appropriate corresponding level of access.

The user device 1140 also includes a processing unit 1152. The user device 1140 also includes a memory 1154 that includes a partitioned memory 1156. The user device 1140 also includes an operating system 1158 that includes a partitioning module 1160 to provide a mechanism to separate private user information in a way that preserves the user information's privacy and secrecy. The processing unit 1152, the memory 1154, and the operating system 1158 support the operation of the user device 1140 to provide information to an emergency responder 120.

For example, the partitioned memory 1156 may set aside a certain region of memory, such as a region that is fixed, variable, or dynamic, for the storage of protected information. While it is not required that the protected information have safeguards to protect it from access, embodiments may provide hardware and software safeguards to ensure that only authorized access to the protected information occurs. For example, various hardware and software mechanisms provide that access to the partitioned memory 1156 can only occur in certain ways. For example, hardware techniques such as physical tokens, CPU identifier checking, enforcing checks for a safe execution environment, encrypted execution, and physical barriers, such as physical memory protection (PMP), may manage safety for the access to the protected information.

Moreover, the partitioned memory 1156 and the partitioning module 1160 provide protective barriers, by setting aside a region of memory 1154 that is only accessible in certain ways defined by partitioning module 1160, thereby additionally ensuring that the protected information is only accessed in sanctioned ways. For example, memory protection techniques such as segmentation, paged virtual memory, protection keys, protections rings, simulated segmentation, capability-based addressing, and dynamic tainting, as non-limiting examples, may ensure that protected information is only accessed in sanctioned ways. Other forms of software may control access to physical and/or virtual memory in ways that control access to protected information to avoid improper usage.

Figure 12:
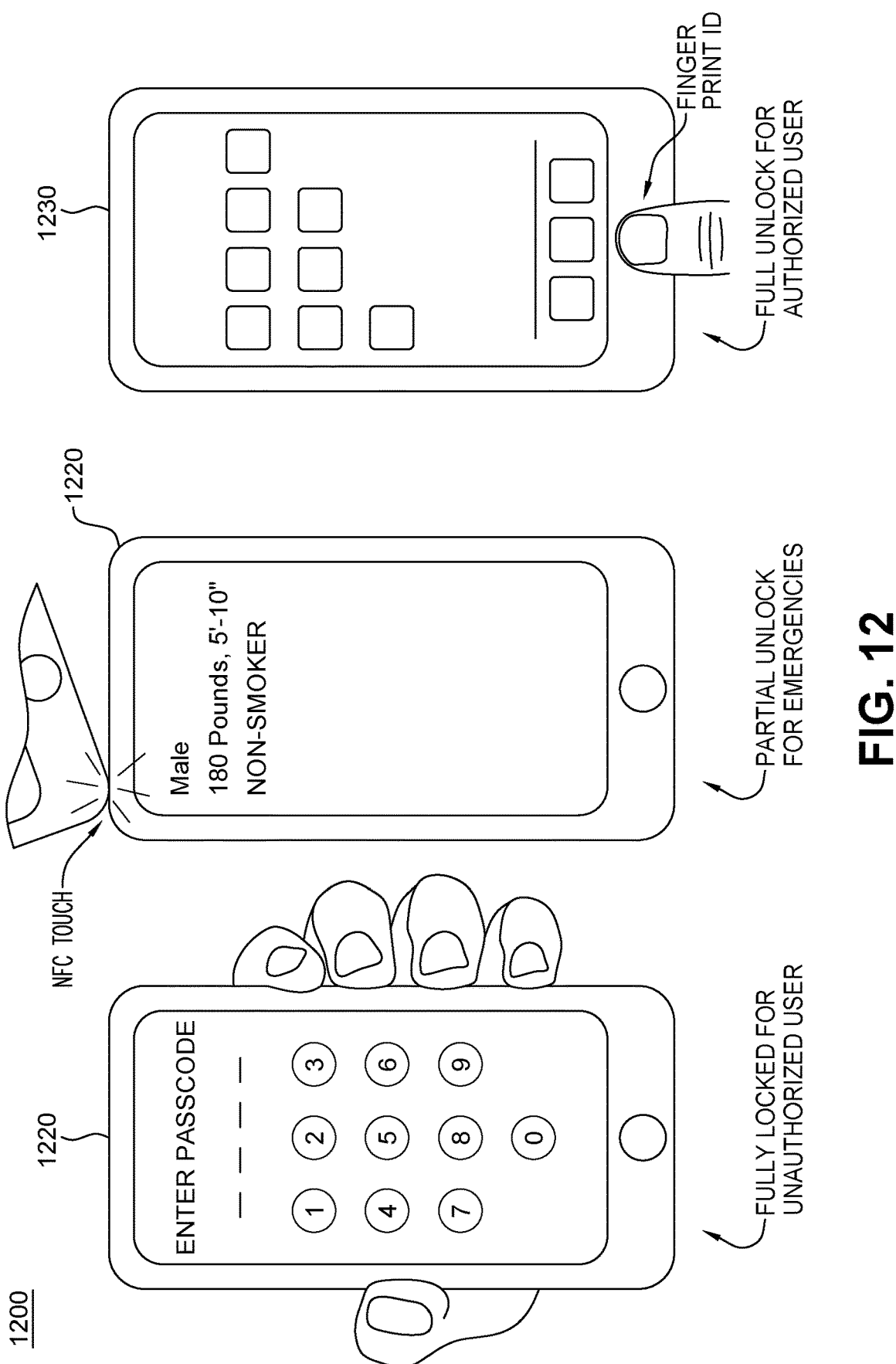
FIG. 12 shows user interface diagrams of interacting with a smartphone with varying levels of access, according to certain embodiments.

FIG. 12 shows user interface diagrams 1200 of interacting with a smartphone with varying levels of access, according to certain embodiments. Diagram 1210 shows a smartphone that is usually fully locked for an unauthorized user. For example, an unauthorized user holds the smartphone in his or her hand. The fully locked smartphone presents a screen that allows the user to enter a passcode. Thus, the smartphone allows a user to establish authorized access by entering a passcode. For example, the legitimate user 110 may have a passcode that allows full access to the smartphone. Alternatively, there may be a number of authorized users, each identified with their own passcode. Further, different classifications of emergency responders may be provided with certain pre-arranged passcodes. For example, a medical responder might enter a passcode of "54321" and a police responder might answer with a passcode of "65432."

Diagram 1220 shows a smartphone that is partially unlocked in emergencies. Diagram shows that a responder's smartphone 140 initiates a near-field communication (NFC) transaction by placing the two smartphones into physical contact with one another. Diagram shows that by virtue of the physical contact, the phone is partially unlocked. FIG. 12 shows providing vital information, which here includes the information that the user is male, weighs 180 pounds, is 5'10" tall, and is a non-smoker.

Diagram 1230 shows a smartphone that is fully unlocked. Here, the user 110 establishes his or her authority to fully unlock the phone using a fingerprint ID. However, other techniques may allow the user 110 to establish his or her identity, such as facial recognition, retinal recognition, and voice recognition. These are only non-limiting examples, and other biometric and non-biometric credentials may give a user 110 full use of his or her smartphone 130. For example, diagram 1230 shows a smartphone that provides full access to a set of apps for a smartphone. Thus, when the smartphone is fully unlocked, access to information is completely unrestricted and the user 110 can access the actual content of all information. However, this is only one embodiment, and in some embodiments a smartphone or similar device is configured to be used by multiple users, and some data is shared by the multiple users, while some is only accessible to particular users.

Figure 13:
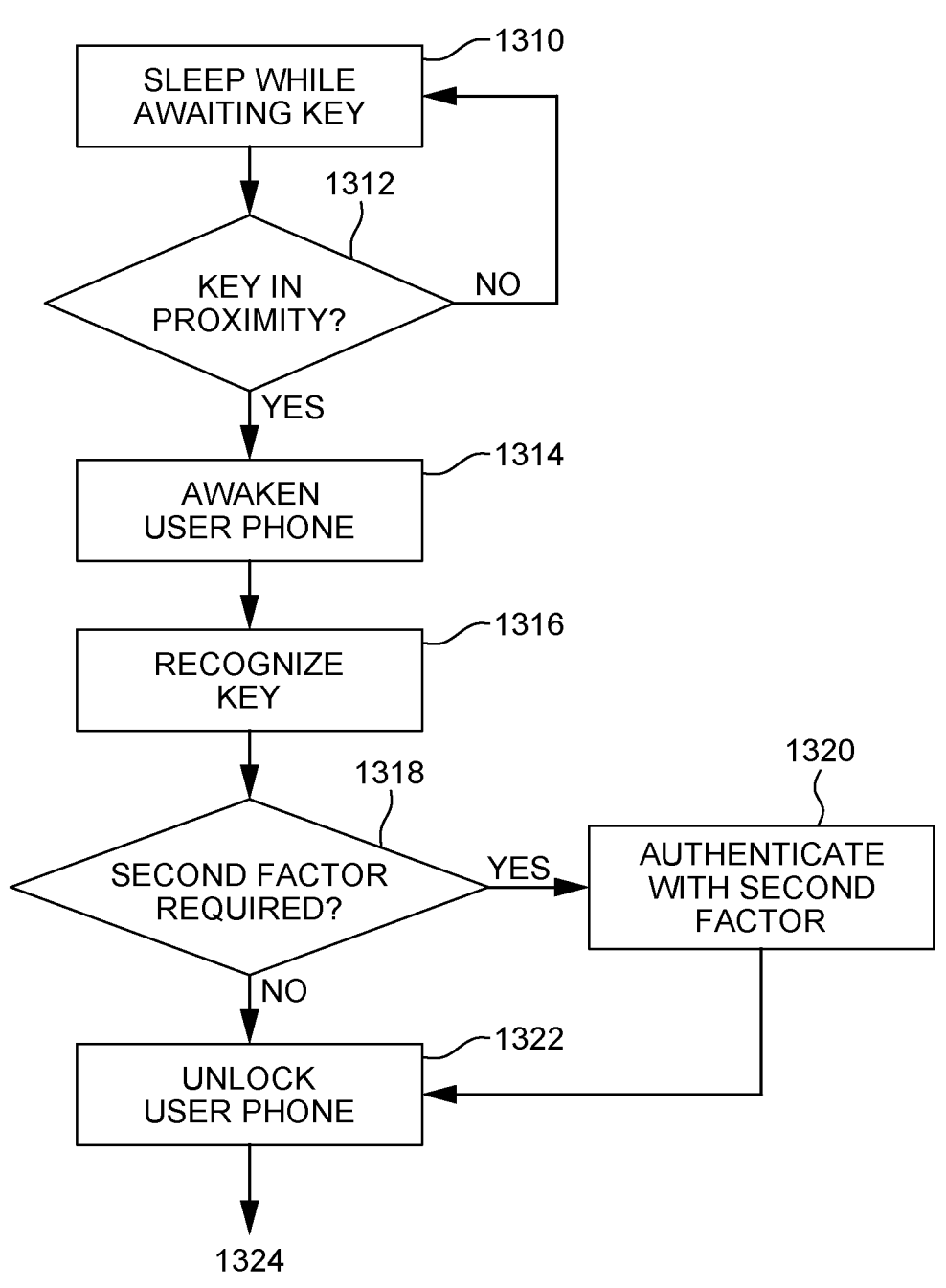
FIG. 13 is a flowchart of a method of establishing access to protected information, according to an embodiment.

FIG. 13 is a flowchart of a method 1300 of establishing access to protected information, according to an embodiment. The method 1300 shows a first step 1310 of sleeping while awaiting an electronic key or credential to unlock the user's smartphone 130. However, the smartphone 130 is only sleeping in one example, and the smartphone 130 may also be awaiting an electronic key or credential in a powered-on and awake state, and respond when such a key or credential is detected. The method 1300 shows a second step 1312 of checking if there is a key in proximity to the smartphone 130 (which may be sleeping). If there is no key in proximity to the smartphone 130, the method 1300 returns to first step 1310 to sleep (if relevant) while awaiting activation by an electronic key or credential.

However, if there is an electronic key or credential or a device with such a key or credential in sufficient proximity to the sleeping smartphone 130, the method 1300 continues with a third step 1314, which awakens the user's smartphone 130, if necessary. After the user's smartphone 130 is awake, the method 1300 continues with a fourth step 1316 in which the user's smartphone 130 recognizes the proximate electronic key or credential. For example, such recognition may occur by using near-field communication (NFC) between the user's smartphone 130 and the smartphone 140 of the emergency responder 120, or another near-field communication (NFC) identification chip owned by the emergency responder 120, such as part of a wearable device or an article of clothing or jewelry, such as a badge, bracelet, or ring.

Once a key or credential is recognized in fourth step 1316, the method 1300 continues with a fifth step 1318 in which the method 1300 determines if a second factor of authentication is required or not. The need for a second factor depends upon the nature of an embodiment as well as the degree of need to keep the protected information secure. If so, the method 1300 proceeds to a sixth step 1320 in which authentication with the second factor occurs. However, authentication is not limited to a single second factor and multiple second factors or stages of security may be relevant.

Once a key or credential has been recognized and any second factor received and used for authentication, the method 1300 proceeds to a seventh step 1322 in which the method 1300 unlocks the user's smartphone 130. Thus, FIG. 13 presents the first part of managing access to sensitive information in a specified method 1300. After seventh step 1322, the operation of the method 1300 continues with an eighth step 1324, which is further described in the operations presented in the method 1400 of FIG. 14.

Figure 14:
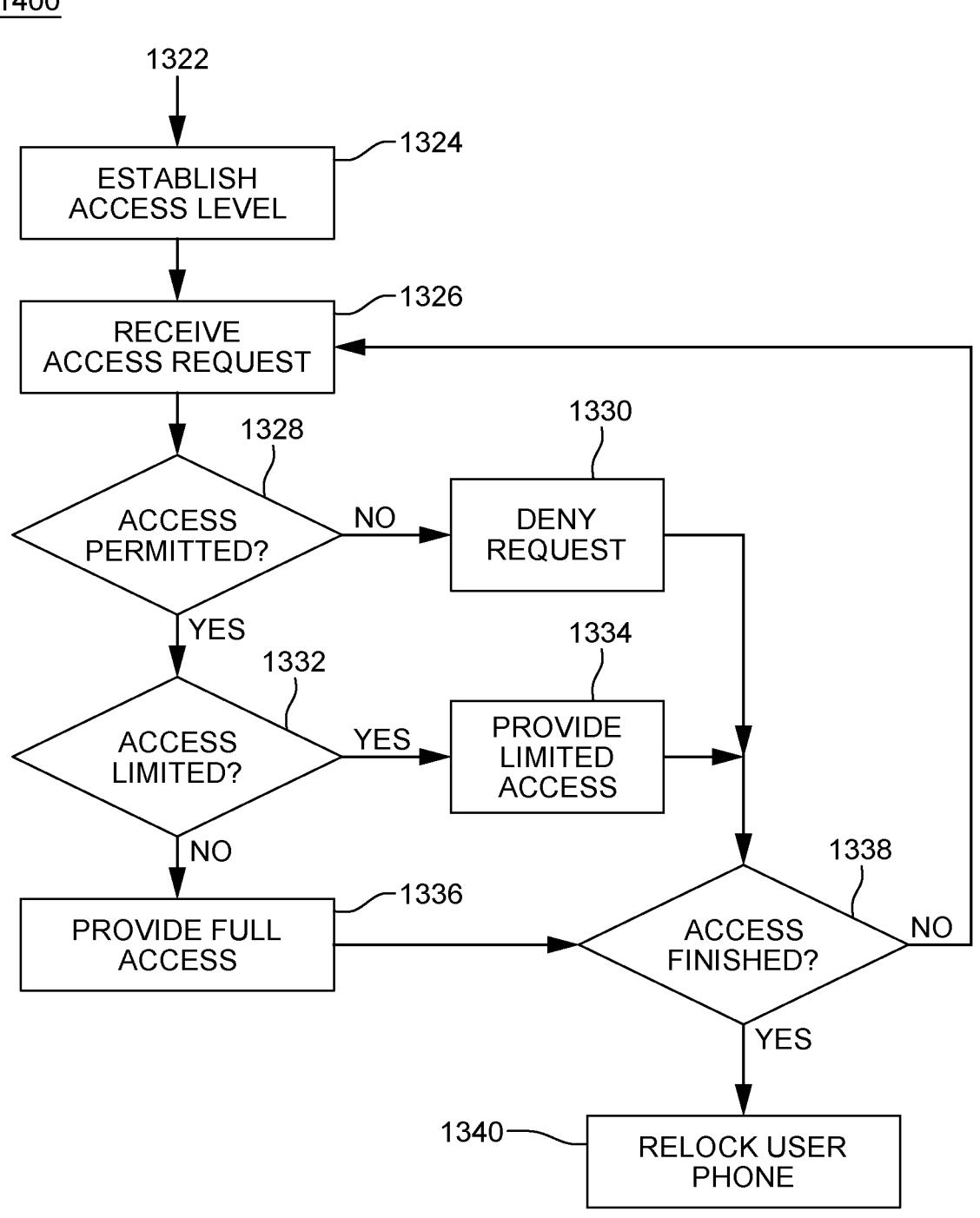
FIG. 14 is a flowchart of a method of accessing protected information, according to an embodiment.

FIG. 14 is a flowchart of a method 1400 of accessing protected information, according to an embodiment. The method 1400 begins with an eighth step 1324, which continues a method after step 1322 of method 1300. In eighth step 1324, the method 1400 establishes an access level for an emergency responder 120. Such an access level is based on the type of emergency responder 120 and the access privileges a user 110 allocates for that type of emergency responder 120, such as illustrated in FIG. 8.

After eighth step 1324, the method 1400 continues with a ninth step 1326 in which the smartphone 130 receives an access request. Such an access request, in the context of FIG. 14, generally comes from an emergency responder 120. The access request may be handled through an interface provided to supply information to an emergency responder 120, such as in FIG. 3, FIG. 5, or FIG. 6. The method of 1400 continues with a tenth step 1328 that determines whether the emergency responder 120 has some level of access to the requested information. Such access is based on a type of emergency responder 120, in that some emergency responders have access to some information (whether full or partial) while being denied access to other information. For example, medical responders may have access to certain types of medical information that might be kept secret from a police officer responder.

If not, the method 1400 continues to an eleventh step 1330. If so the method 1400 continues to a twelfth step 1332. In the eleventh step 1330, the method 1400 denies the access request, in that the user 110 does not have any access privileges to the requested information. In twelfth step 1332, the method 1400 determines if the emergency responder's access is limited. If so, the method 1400 continues to a thirteenth step 1334. If not, the method 1400 continues to a fourteenth step 1336. In the thirteenth step 1334, the method 1400 provides limited access to the information, as discussed above. For example, a medical responder is granted access to the portions of a user's medical history that correspond to what they need, or a police responder accesses emergency contacts indirectly to preserve user privacy.

In the fourteenth step 1336, the method 1400 provides full access to the information. For example, a health insurer might need a user's full Social Security number or health insurance number to confirm a user's identity and serve the user 110. After eleventh step 1330, thirteenth step 1334, or fourteenth step 1336, the method 1400 performs a fifteenth step 1338 that checks to see if the emergency responder 120 is done accessing the user's smartphone 130. If so, the method 1400 performs a sixteenth and final step 1340 that relocks the user's smartphone 130, so that the access provided to the emergency provider 120 is not subsequently abused. If not, the method 1400 returns to ninth step 1326 to receive another access request, continuing the emergency access process.

Thus, the embodiments described herein may provide certain advantages. In particular, the embodiments provide a way for an emergency responder 120 to access information that is confidential and/or private. At the same time, the information may only be partially disclosed, so that the information is accessed at a level that allows the information to be accessed only to the extent needed for the emergency. Additionally, some embodiments use memory protection mechanisms to help ensure that protected information is only accessed by parties with legitimate access to the information. For example, during a medical emergency, a medical responder may access information such as drug regimens and drug allergies to avoid using medications that could hurt a patient.

Alternatively, if a police officer arrives at a traffic accident, the police officer may be granted access to emergency contacts of the user using general designations such as "spouse" that preserve the identity and phone number of the spouse as private while allowing the police office to communicate with the spouse. Thus, embodiments provide a technical solution to allowing emergency responders access to the protected information they need in emergencies while keeping protected information protected in accordance with the privacy requirements of the user to whom the protected information belongs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for secure selective disclosure of protected information of a first user at a first mobile device of the first user, the method comprising:

using a partitioning module running on the first mobile device to partition a region of memory on the first mobile device, the region of memory only accessible using mechanisms defined by the partitioning module;

storing protected information of the first user in the region of memory;

detecting a second mobile device in proximity to the first mobile device of the first user;

receiving a credential from the second mobile device;

partially unlocking the first mobile device of the user based on the credential;

determining a type of a second user of the second mobile device, based on the credential;

establishing access privileges for the second user to the protected information of the first user based on the type of the second user;

receiving an access request for protected information of the first user from the second user; and providing access to the requested protected information in the region of memory to the second user based on the access privileges, wherein the second user has partial access to some of the protected information in the region of memory based on the access privileges.

2. The method of claim 1, further comprising:

detecting a third mobile device in proximity to the first mobile device of the user;

receiving a second credential from the third mobile device;

determining a type of a third user of the third mobile device based on the second credential; and establishing second access privileges for the third user to the protected information of the first user in the region or memory based on the type of the third user, wherein the third user has partial access to some of the protected information in the region of memory based on the second access privileges.

3. The method of claim 1, further comprising, after receiving the credential, performing a secondary form of authentication of the second user.

4. The method of claim 3, wherein the secondary form of authentication is a form of authentication that corresponds to the type of the second user.

5. The method of claim 1, wherein the first mobile device of the first user provides partial access to the protected information by allowing certain uses of the protected information without fully revealing the protected information.

6. The method of claim 1, wherein the first mobile device of the first user receives the credential from the second mobile device using near-field communication.

7. A method for secure selective disclosure of protected information of a first user at a first mobile device of the first user, the method comprising:

using a partitioning module running on the first mobile device to partition a region of memory on the first mobile device, the region of memory only accessible using mechanisms defined by the partitioning module;

storing protected information of the first user in the region of memory;

receiving a first credential from a second mobile device at the first mobile device of the first user, using near-field communication;

determining a type of a second user of the second mobile device based on the first credential;

providing first access privileges to the protected information of the first user in the region of memory to the second user of the second mobile device, based on the type of the second user;

receiving a second credential from a third mobile device at the first mobile device of the first user, using the near-field communication;

determining a type of a third user of the third mobile device, based on the second credential; and providing second access privileges to the protected information of the first user in the region of memory to the third user, based on the type of the third user.

8. The method of claim 7, wherein the second user has partial access to some of the protected information based on the first access privileges, and wherein the third user has partial access to some of the protected information based on the second access privileges.

9. The method of claim 7, wherein the second user and the third user have access privileges to different parts of the protected information.

10. The method of claim 7, further comprising, in response to determining a type of user based on a credential, displaying vital attributes of the user based on the type of user.

11. The method of claim 7, wherein the partial access allows a user with partial access to a portion of the protected information to provide full access to the portion of the protected information to another user of a type of user having access privileges with full access to the portion of the protected information.

12. The method of claim 7, wherein the protected information that the second user has partial access to includes emergency contacts information and the first mobile device of the first user allows the second user to communicate with the emergency contacts of the first user without divulging the full contact information of the emergency contacts.

13. The method of claim 7, wherein the second user and the third user have partial access from direct access.

14. A method for secure selective disclosure of protected information of a first user at a mobile device of the first user, the method comprising:

using a partitioning module running on the first mobile device to partition a region of memory on the first mobile device, the region of memory only accessible using mechanisms defined by the partitioning module;

storing protected information of the first user in the region of memory;

receiving an access request from a second user to access the mobile device of the first user;

receiving an identification credential from the second user;

partially unlocking the mobile device of the first user based on the identification credential;

determining an identity of the second user associated with the identification credential;

establishing access privileges to the protected information of the first user based on the identity of the second user; and providing access to the protected information in the region of memory to the second user based on the access privileges.

15. The method of claim 14, wherein the identification credential is received by near-field communication with an identification chip.

16. The method of claim 15, wherein identification chip is part of a portable item possessed by the second user.

17. The method of claim 15, wherein the identification chip is integrated into a wearable item worn by the second user.

18. The method of claim 15, wherein the portable item is a piece of clothing worn by the second user.

19. The method of claim 14, wherein the partial access allows some uses of the information by the second user without revealing the full content of the information.

\*   \*   \*   \*   \*